June 24, 1958

E. J. NAILL ET AL 2,839,959

LATHES

Filed Feb. 1, 1956

INVENTOR.
EUGENE J. NAILL
ROBERT W. REYNOLDS
BY

ATTORNEYS

June 24, 1958     E. J. NAILL ET AL     2,839,959
LATHES

Filed Feb. 1, 1956     6 Sheets-Sheet 2

INVENTOR.
EUGENE J. NAILL
ROBERT W. REYNOLDS
BY
ATTORNEYS

June 24, 1958

E. J. NAILL ET AL 2,839,959

LATHES

Filed Feb. 1, 1956

INVENTOR.
EUGENE J. NAILL
ROBERT W. REYNOLDS
BY

ATTORNEYS

June 24, 1958  E. J. NAILL ET AL  2,839,959
LATHES
Filed Feb. 1, 1956  6 Sheets-Sheet 4

INVENTOR.
EUGENE J. NAILL
ROBERT W. REYNOLDS
BY
ATTORNEYS

June 24, 1958 E. J. NAILL ET AL 2,839,959
LATHES
Filed Feb. 1, 1956 6 Sheets-Sheet 5
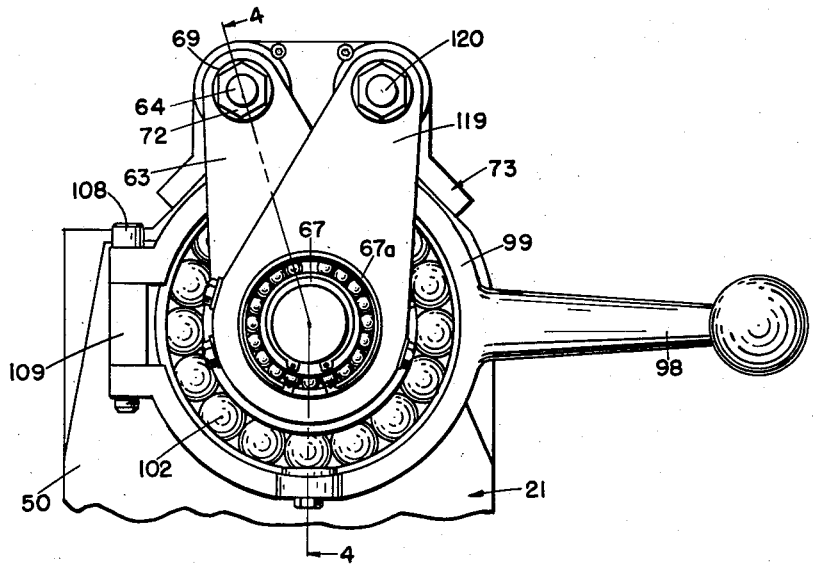
FIG. 5
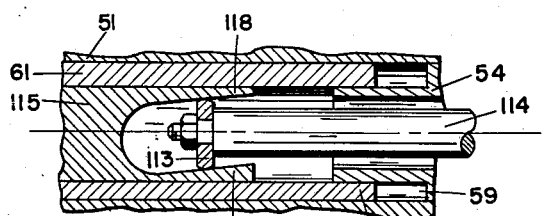
FIG. 7
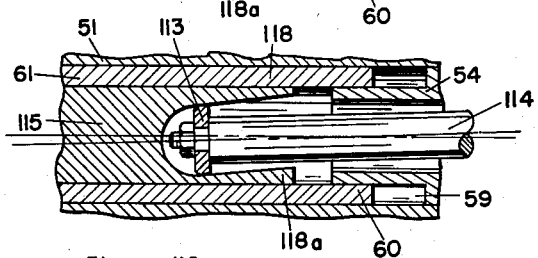
FIG. 8
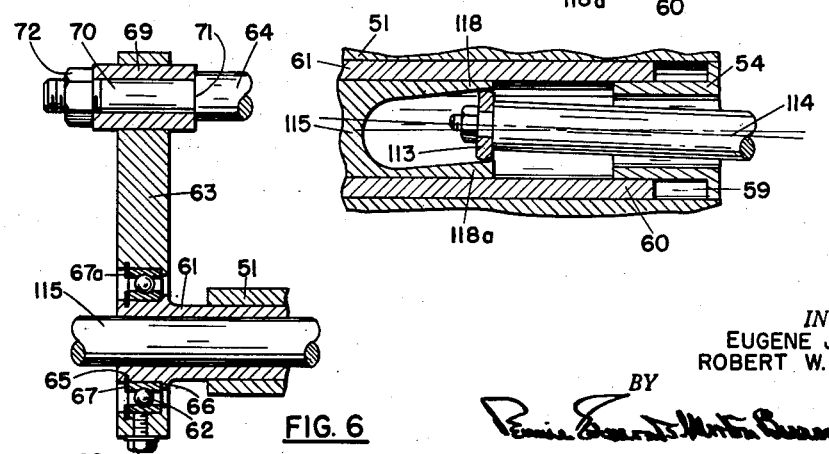
FIG. 9
FIG. 6
INVENTOR.
EUGENE J. NAILL
ROBERT W. REYNOLDS
BY
ATTORNEYS June 24, 1958  E. J. NAILL ET AL  2,839,959
LATHES
Filed Feb. 1, 1956  6 Sheets-Sheet 6

*INVENTOR.*
EUGENE J. NAILL
ROBERT W. REYNOLDS
BY

ATTORNEYS

United States Patent Office 2,839,959
Patented June 24, 1958

2,839,959
LATHES

Eugene J. Naill, New Canaan, and Robert W. Reynolds, Norwalk, Conn., assignors to Machlett Laboratories, Incorporated, Springdale, Conn., a corporation of Connecticut Application February 1, 1956, Serial No. 562,848

12 Claims. (Cl. 82—28)

This invention relates to improvements in machines of the lathe type and has particular reference to a lathe embodying novel work-holding means for supporting work at a controlled angular relation with respect to the axis of the lathe spindle.

In many manufacturing industries where a lathe is used to support an article for rotation while a surface of the article is being shaped, it is often necessary that the surface be referenced upon another surface. This makes it necessary to first axially position the article for rotation about an axis normal to the reference surface and then, during rotation, to form the second surface.

For example, the external side or end surfaces of an article of generally tubular or cylindrical shape may often be formed by using an end surface as a reference. This can be illustrated by a cathode structure of a type commonly found in electron tubes. Such a cathode structure may embody a tubular support having a disc at one end forming a planar electron-emitting surface. The structure is mounted within an envelope by securing an annular supporting surface, such as a circumferential or end portion of the tubular support, to the supporting means encircling the electron-emitting surface. In such electron tubes it is very important that the planar electron-emitting surface be mounted in parallel relation to at least one other planar electrode. The supporting means upon which the cathode structure is to be mounted is made parallel with the other electrode and, therefore, it is essential that the annular supporting surface of the tubular support be exactly parallel with the planar electron-emitting surface in order to permit the electron-emitting surface to be subsequently located parallel with the other electrode in the final assembly.

The novel means for adjustably mounting an article in a lathe is provided, in the present invention, by a ball-and-socket type of work holder which has a spindle or shaft extending longitudinally of and within a rotatable tubular lathe spindle. A device embodying cam surfaces is provided for engagement with a cam follower on the shaft for causing angular adjustment of the shaft with respect to the axis of the spindle and consequent adjustment of the shaft with respect to the axis of the spindle and consequent adjustment of the work holder and work carried thereby. The cam device is operable by manual control means mounted on the top of the machine whereby the work can be adjusted to minute fractions of an inch.

In known prior machines this adjustment was accomplished by placing gaging means adjacent or in engagement with the work and tapping the work to adjust it in a chuck. This method involved time-consuming operations and resulted in inaccurate adjustments. Furthermore, it was impossible to adjust the work to such a fine degree as is possible with the present invention.

Accordingly, it is a principal object of this invention to provide a machine of the lathe type with improved work-supporting means whereby the work can be quickly and accurately adjusted to a predetermined desired position in the machine.

Another object is to provide means in a lathe for supporting work for angular adjustment with respect to the axis of te lathe spindle.

A further object is to provide a lathe with manually controlled adjustable work-supporting means whereby work may be adjusted in the machine accurately, quickly, and to a fine degree.

Other objects and advantages of the invention will become apparent from the following description taken in connection with the accompanying drawings wherein—

Fig. 5 is an end view of the device shown in Fig. 2;

Fig. 6 is a reduced vertical sectional view through one of the connecting plates of the adjusting mechanism;

Fig. 7 is an enlarged fragmentary sectional view taken substantially on line 7—7 of Fig. 4 looking in the direction of the arrows and showing the means for adjusting the work in one plane in position for maintaining the work in alignment with the axis of the lathe spindle;

Figs. 8 and 9 are views similar to Fig. 7 respectively showing the adjustment means including the axis of the work laterally on opposite sides of the axis of the spindle;

Figs. 10, 11 and 12 are vertical sectional views generally similar to Figs. 7–9 illustrating the means for adjusting the work in the opposite plane;

Fig. 13 is an enlarged sectional view taken substantially on line 13—13 of Fig. 4; and Fig. 14 is an enlarged fragmentary sectional view through the work-holding means.

Figure 1:
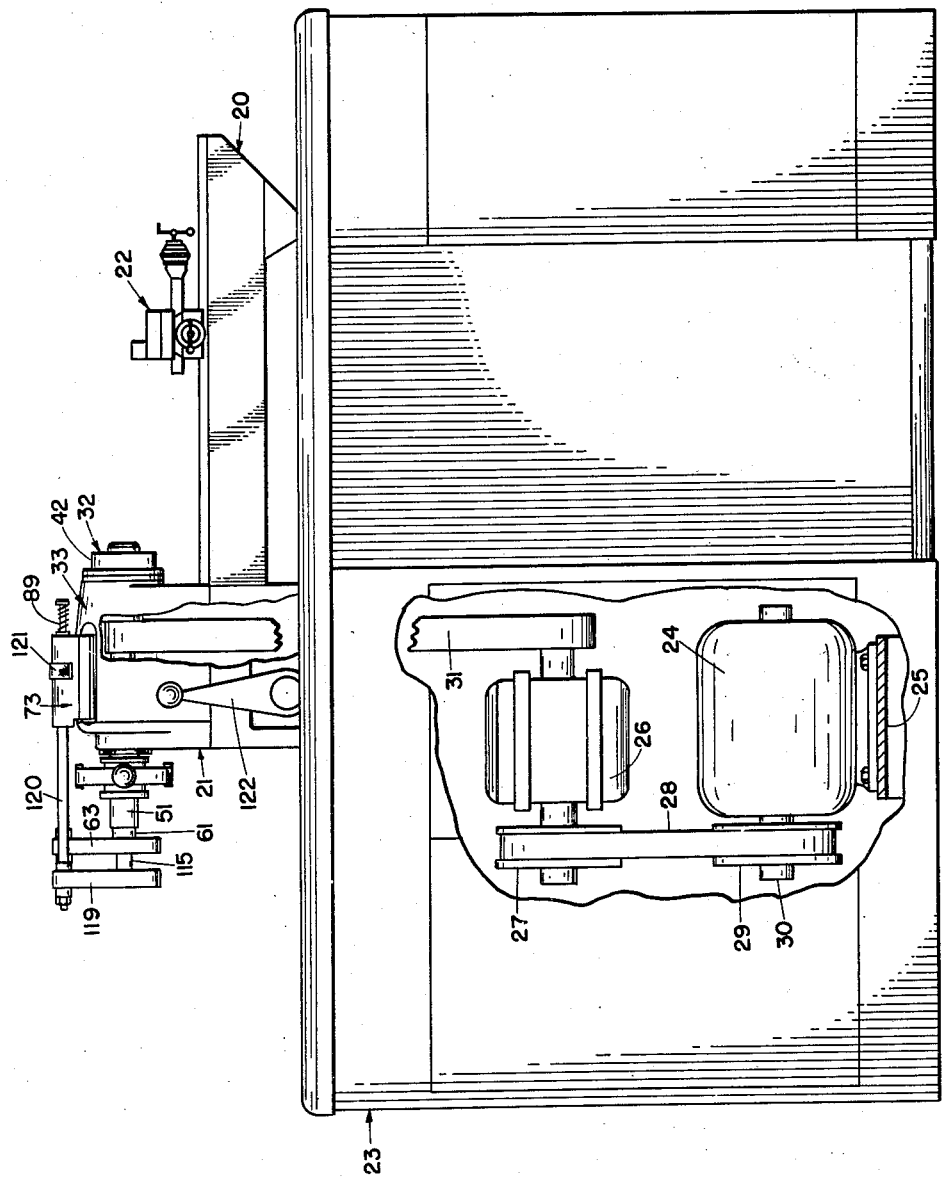
Fig. 1 is a front elevational view of a lathe embodying the invention.

Referring more particularly to the drawings wherein like characters of reference designate like parts throughout the several views, the machine which embodies the invention, as shown in Fig. 1, is a lathe which includes a bed 20, a headstock 21, and a slide rest 22 all mounted on a bench or cabinet 23. Within the cabinet 23 is a motor 24 which is supported by suitable means 25 beneath a gear box 26. A chain of gears (not shown) in box 26 carries at one end a pulley 27 which is connected by a belt 28 to a pulley 29 carried by the motor drive shaft 30, and at its other end the chain of gears is connected by a second belt 31 to the spindle 32 of the headstock 21, as will be more fully described hereinafter.

In a machine of this type a piece of work is mounted in the headstock spindle 32. A gauge may be positioned adjacent the work such as by being mounted in the slide rest 22 and the slide rest moved toward the headstock until the gauge is in proximity to or engagement with the work. Suitable gauges for this purpose are mechanical indicators, air gauges or capacity gauges which will indicate runout of the work at the point engaged or proximated during rotation of the work. After the work has been subsequently adjusted in the headstock by the novel means embodying this invention, to be described below, a cutting or abrading tool 123 (Figs. 2 and 3) is then placed in a supporting portion 124 of the slide rest 22 and the slide rest is moved along the bed 20 to position the tool 123 in engagement with the work, to perform the shaping operation.

The headstock 21 is actually mounted on one end of the bed 20 and comprises a frame 33 having a pair of spaced vertical upright portions 34 and 35 (Fig. 4) which are fixed to the bed 20. Concentric openings are provided in the upright portions 34—35 for rotatably receiving the spindle 32. The spindle 32 is mounted in the openings by means of ball and roller bearing units 36 and 37, with dust shields 38 being located adjacent the ends of the bearings for protective purposes.

Spaced sleeves 39 and 40 are carried by the spindle 32 and locate between them a fixed pulley 41 which is engaged by the belt 31. The spindle 32 is thus rotatable in the headstock and is adapted to be driven by the motor 24 through drive shaft 30, pulley 29, belt 28, pulley 27, gears in box 26, belt 31 and pulley 41.

The end of the spindle 32 which is directed toward the slide rest 22 is enlarged to form a cylindrical portion 42 which lies outside the frame and bears against an annular spacer 43 which resides against the inner race of the adjacent bearing 37. Thus the spindle is prevented from longitudinal displacement in a direction away from the tailstock 20.

Adjacent the outer end of the other bearing 36 is a sleeve-like spacer 44 which fits upon the spindle 32 with one end engaging the inner race of bearing 36 and the other end being engaged by a nut 45 which is threadedly mounted on the spindle. This structure prevents displacement of the spindle longitudinally toward the tailstock 20.

The bearing units 36 and 37 are prevented from moving toward one another by respective shoulders 46 and 47 formed on the outer races, which shoulders engage annular projecting portions 48 and 49 of the respective upright portions 34 and 35. A cover plate or dust cap 50 covers the end of the headstock 21 and has an opening encircling the nut 45 and adjacent portion of the spindle 32.

The spindle 32 is tubular in shape and into one end is fitted a tubular draw bar 51. Into the other end of the spindle is fitted a master collet 52, which is threadedly connected with the draw bar 51 at their adjacent inner ends. The outer ends of the master collet 52 and spindle 32 are provided with engaging inclined surfaces 53. In the operation of the machine the draw bar 51 is adapted to be axially urged, by means to be described hereinafter, in a direction outwardly of the bore and consequently tends to pull the master collet 52 in the same direction.

Fitted within the draw bar 51 and rotatable therewith is a torque sleeve 54 which has mounted over one end the inner end of a stator collet 55. Collet 55 is located within the master collet 52 and is made to rotate with sleeve 54 by means such as one or more screws 56. The outer end portion of the stator collet 55 is enlarged so as to overlie the outer end of the master collet 52 and the sleeve-collet assembly is held in place within the draw bar 51 and master collet 52 by an annular plate 57 which is bolted or otherwise removably secured to the end of the spindle 32, the plate 57 having an annular lip 58 which engages the outer surface of a ledge formed on the stator collet 55 to prevent withdrawal of the stator collet.

The inner end of the torque sleeve 54 is provided with a pair of diametrically opposed longitudinal slots 59 (Figs. 4, 7, 8 and 9) in which are respectively positioned tongues 60 projecting from the adjacent end of a cam tube 61. The cam tube 61 resides within the draw bar 51 and is slidable therein in a direction toward and away from the torque sleeve 54. The outer end of the cam tube 61 extends outwardly beyond the end of the draw bar 51 and is rotatably mounted by a ball bearing unit 62 (Fig. 6) within an opening in one end of a connecting plate 63 which extends upwardly toward and is connected to an adjusting rod 64. Adjacent the outer end of the cam tube 61 is a circumferential groove 65 and, spaced inwardly therefrom, a circumferential lip 66. The bearing unit 62 is located between the groove and lip and is held in place by an annular retaining ring 67 which is fitted into the groove 65. The adjacent annular surface defining the opening in the connecting plate 63 is provided with a similar groove and lip arrangement with a second retaining ring 67a being located in the groove, thereby securely connecting the parts together. Additional securement may be provided by a plurality of screws 68 which extend through the wall of the plate 63 and engage the bearing unit 62.

Fixedly secured to the upper end of the connecting plate 63 is a bushing 69 which is mounted upon a reduced end portion 70 of the adjusting rod 64 and which at one end engages the shoulder 71 formed thereby on rod 64. The end portion 70 is threaded for reception of a nut 72 which retains the parts in firm assembled relation.

The frame 33 has a support 73 (Figs. 2, 3 and 4) secured to its upper surface as by screws 74, the support 73 including a pair of longitudinally spaced uprights 75 and 76. The uprights 75—76 are provided with concentric openings through which extends the adjusting rod 64. Between the uprights is located a knurled adjusting nut 77 which is threadedly mounted upon a threaded portion 78 of the rod 64. Thus, by manual rotation of the knurled nut 77 the adjusting rod 64 and connecting plate 63 can be moved in a direction longitudinally of the machine. Such movement consequently causes axial movement of the cam tube 61 within the draw bar 51. The adjusting rod 64 moves axially within bearing balls 79 mounted in the opening in upright 75, the bearing balls 79 being contained within an annular retainer 80 and restrained from axial displacement by means such as annular rings 81.

The opening in upright 76 is of smaller diameter than the opening in upright 75 and likewise contains ball bearings 82 which permit low friction axial movement of the rod 64. The balls 82 are contained within a retainer 83 and are prevented from displacement inwardly of the device by a ring 84. At the outer end of the retainer 83 is located a flanged ring or collar 85, the flange 86 thereof encircling the rod 64. Over the end portion of the rod 64 is a second flanged ring or collar 87, the flange 88 thereof extending toward flange 86. Mounted upon the flanges 86—88 between collars 85—87 is a coiled compression spring 89 which urges the collar 87 in a direction away from upright 76 and into engagement with a disc 90 screwed or otherwise secured to the end of the rod 64. Spring 89 thus functions, by urging collar 87, disc 90 and rod 64 in the manner described, to take up slack which exists in the threaded connection between the nut 77 and threaded portion 78 of the rod 64. A thrust bearing 91 between the nut 77 and upright 76 further assists in providing smooth positive action of the parts of the device.

Operation of this adjusting means functions, as has been described, to move the cam tube 61 axially within the draw bar 51. This is for the purpose of adjusting a piece of work within the stator collet 55. To accomplish this, a ball collet 92 (Figs. 4 and 14) is positioned in a spherical recess provided therefor in the stator collet 55. The ball collet 92 has a keyway or slot 93 into which projects a threaded key 94 extending through the stator collet 55 whereby the collets are keyed together for simultaneous rotary movement with the master collet 52, draw bar 51 and spindle 42. The ball collet 92, stator collet 55 and master collet 52 are all formed with a plurality, preferably three, of aligned slots, indicated in ball collet 92 by numeral 95 (Fig. 14), forming resilient jaws therebetween. A piece of work 96, as indicated by dotted lines, thus may be inserted within the jaws of the ball collet 92 and the resilient portions of all three collets compressed together by the cooperative action of inclined surfaces 53 to firmly clamp the work in place.

All pressure upon the jaws of the ball collet 92 must be released, however, before a piece of work can be inserted therein. This is accomplished by sliding the draw bar 51 axially toward the slide rest 22. Such sliding movement of the draw bar causes its extreme end nearest the work 96 to move into a groove 97 (Figs. 4 and 14) provided therefor in the inner surface of the stator collet 55, thereby breaking the frictional engagement of inclined surfaces 53 and thus releasing pressure upon both the stator collet 55 and ball collet 92, permitting the work piece 96 to be inserted in the ball collet 92.

When the work is positioned in the ball collet 92 the draw bar is moved axially in a direction away from the slide rest 22. When this is done the frictional engagement of inclined surfaces 53 causes the resilient portions of the master collet 52 to again exert pressure upon the slotted resilient portions of the stator and ball collets, whereby the work is firmly clamped in position.

Conventional means is provided for manually moving the draw bar 51 to clamp or loosen the work 96 and includes a hand lever 98 (Figs. 2, 3 and 5) which is connected to a hand lever ring 99. Ring 99 encircles the outer end portion of the draw bar 51 and carries stirrups 100 (Fig. 4) which are secured within the upper and lower portions thereof by means such as screws 101. The stirrups 100 receive the outer race of an annular ball bearing unit 102, the inner race of which closely encircles a fulcrum sleeve which comprises an outer ring 103 in which is slidably nested an inner ring 104. The inner ring 104 is provided with a plurality of small recesses or openings 105 into which extend the short arms of respective finger levers 106 which are pivotally mounted within openings 107 in the outer ring 103. The hand lever ring 99 is connected by a pivot 108 (Figs. 3 and 5) to a bracket 109 carried by the frame 33.

Movement of the hand lever 98 to the left causes movement in the same direction of the ring 99 and bearing 102. The bearing engages the finger levers 106, causing the short arms thereof to be urged against the sides of the recesses 105. This causes the outer ring 103 of the fulcrum sleeve to slide on the inner ring 104 into engagement with a collar 110 which is carried by the draw bar 51. Pressure of outer ring 103 on collar 110 causes the collar to pull the draw bar 51 outwardly and thereby clamp a workpiece 96 in place as described. Movement of the hand lever 98 in the opposite direction, through action of the bearing 102 on outer ring 103, causes consequent movement of the parts of the device in the same direction as the hand lever 98 to release the workpiece 96.

The means for adjusting the workpiece 96 in accordance with this invention comprises camming means formed on the cam tube 61 (Figs. 4 and 7–12). The inner end of the cam tube 61 is bifurcated to form two diametrically opposed extensions 111 and 112, the inner surfaces of which act as cams. The cams are engaged by a cam follower 113 which is secured to the end of a shaft 114 having its other end formed integral with the ball collet 92. The shaft 114 is substantially smaller than the inside diameter of the torque tube 54 through which it extends and thus can be angled about the center of rotation of the ball collet as the follower 113 follows the cam surfaces when the cam tube 61 is moved axially by the adjusting device described hereinbefore.

Angular movement of the shaft 114 will thus adjust the workpiece 96, but such adjustment will be in only a single plane. To provide universal adjustment, a second camming device is provided for moving the cam follower in a plane normal to the plane in which the follower is moved during the above-described adjusting process. The second adjustment is accomplished through a cam shaft 115 which is located within the cam tube 61. The cam shaft 115 is provided with a pin 116 (Fig. 4) the ends of which extend into slots 117 formed in the cam tube 61 whereby the shaft is rotatable with the tube but is independently axially movable within the tube.

The inner end of the cam shaft 115 is provided with two diametrically opposed extensions 118 and 118a the inner surfaces of which are cam surfaces which engage the sides of the cam follower 113 at 90° intervals with respect to the extensions 111 and 112. Axial movement of the cam shaft will, therefore, cause movement of the cam follower 113 and shaft 114 in a plane normal to the plane of movement produced by axial movement of the cam tube 61. By this means the ball collet 92 can be universally adjusted within the stator collet 55 and so adjust the workpiece 96 as desired.

Axial movement of the cam shaft 115 is accomplished by a device similar to the device used to move the cam tube 61. The outer end of the cam shaft 115 extends beyond the end of the cam tube 61 (Fig. 6) and is rotatably supported by a connecting plate 119 (Figs. 1, 2, 3 and 5) in a manner similar to the connection of cam tube 61 to plate 63 (Fig. 6). Connecting plate 119 is secured to an adjusting rod 120 which extends parallel to adjusting rod 64 through the uprights 75 and 76 of support 73. The rod 120 is movable longitudinally by a knurled nut 121 in the same manner in which rod 64 is moved. Thus, by manual rotation of the two knurled nuts 77 and 121, the work piece can be adjusted as desired and with a micrometer adjusting means of this type the adjustment can be performed to minute fractions of an inch.

Figure 4:
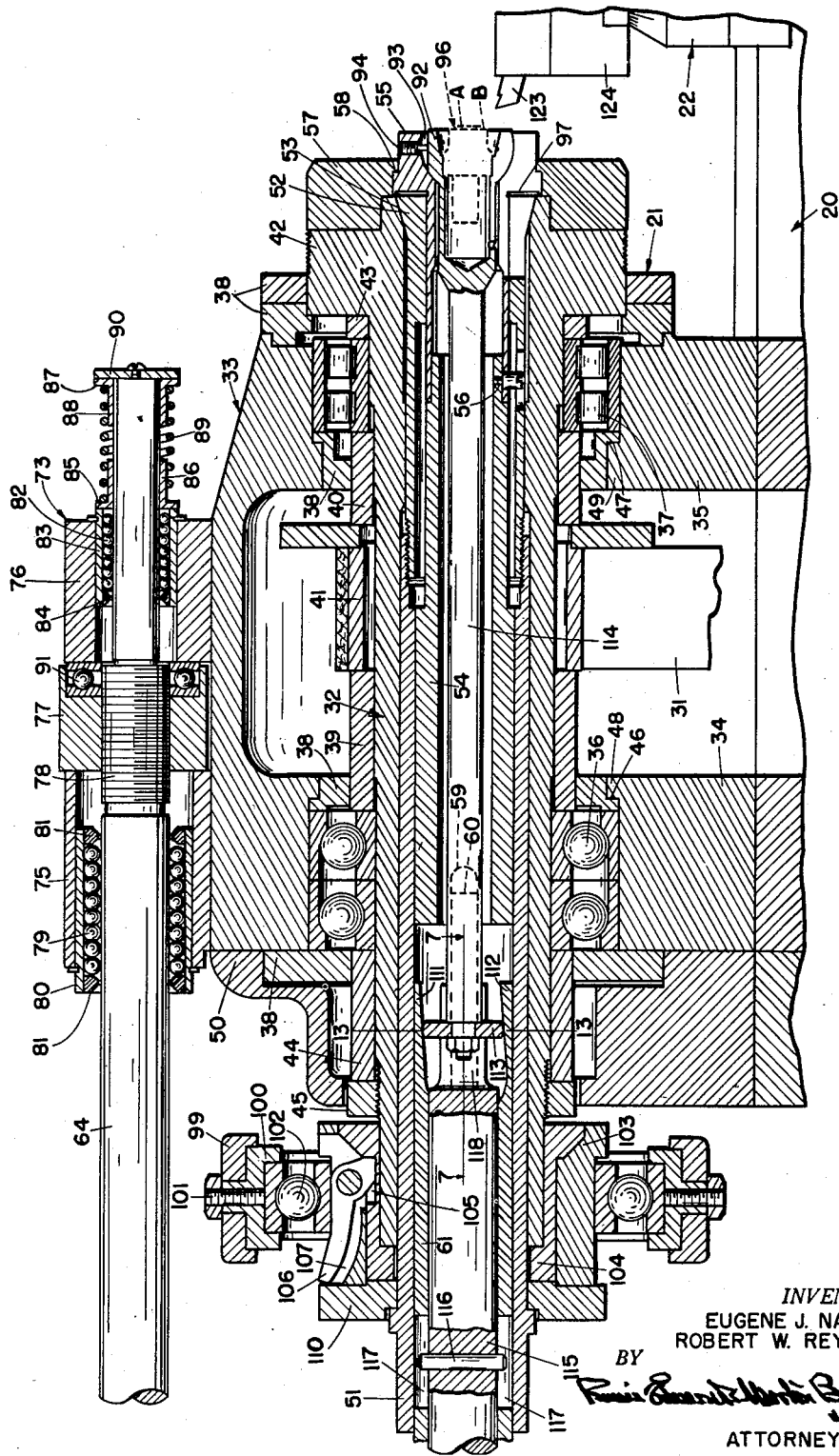
Fig. 4 is a fragmentary vertical sectional view taken substantially on line 4—4 of Fig. 5 and looking in the direction of the arrows.

In using a machine of this type for forming a surface of an article parallel with a second or reference surface, an electron tube cathode, as shown by dotted lines in Figs. 4 and 14 and indicated by numeral 96, will serve as an example. The cathode 96 has a planar electron-emitting surface A, which is the reference surface in this illustration, and an annular planar surface B is to be formed parallel with and encircling surface A.

Figure 2:
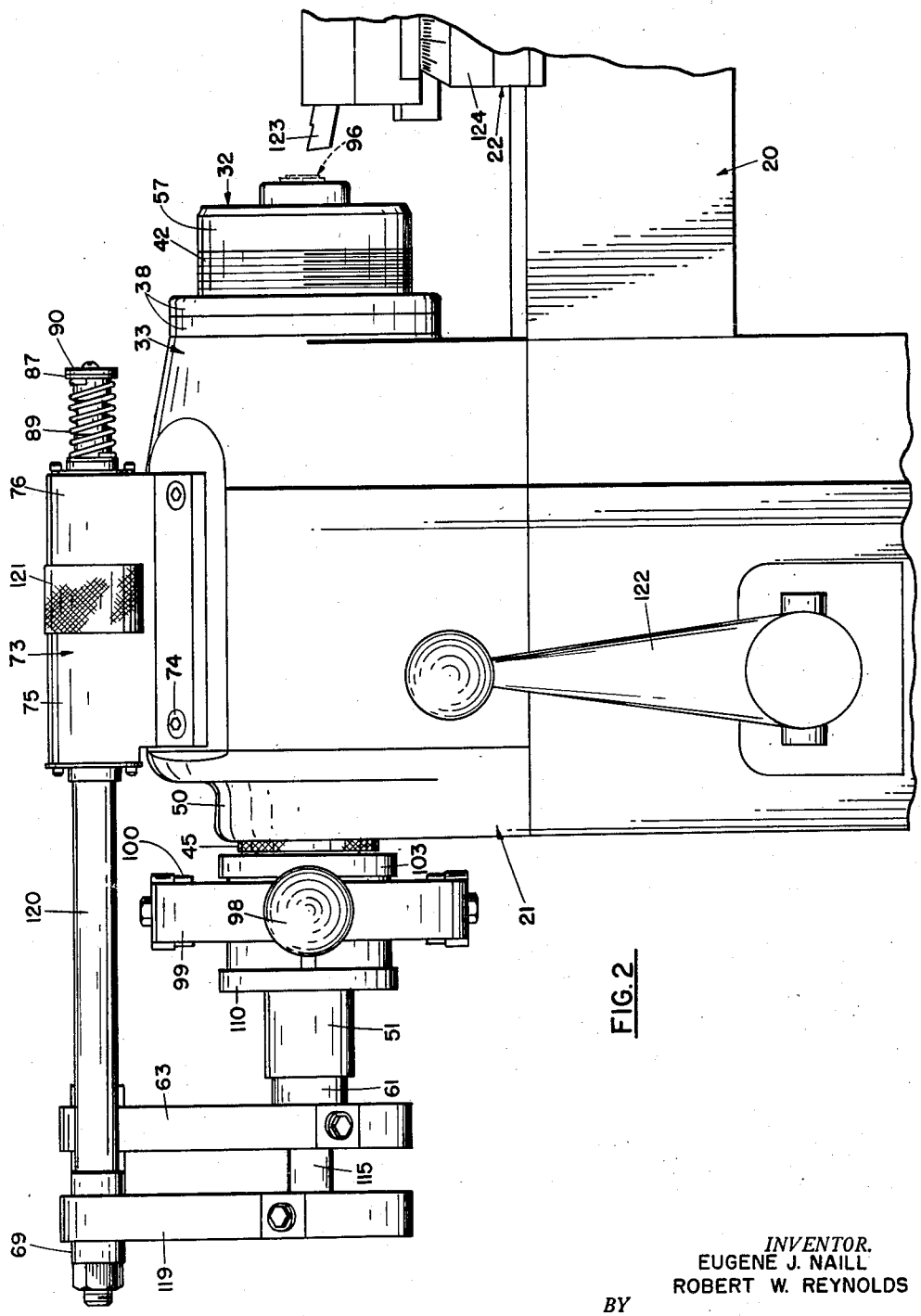
Fig. 2 is an enlarged front elevational view of the headstock of the lathe shown in Fig. 1.
Figure 3:
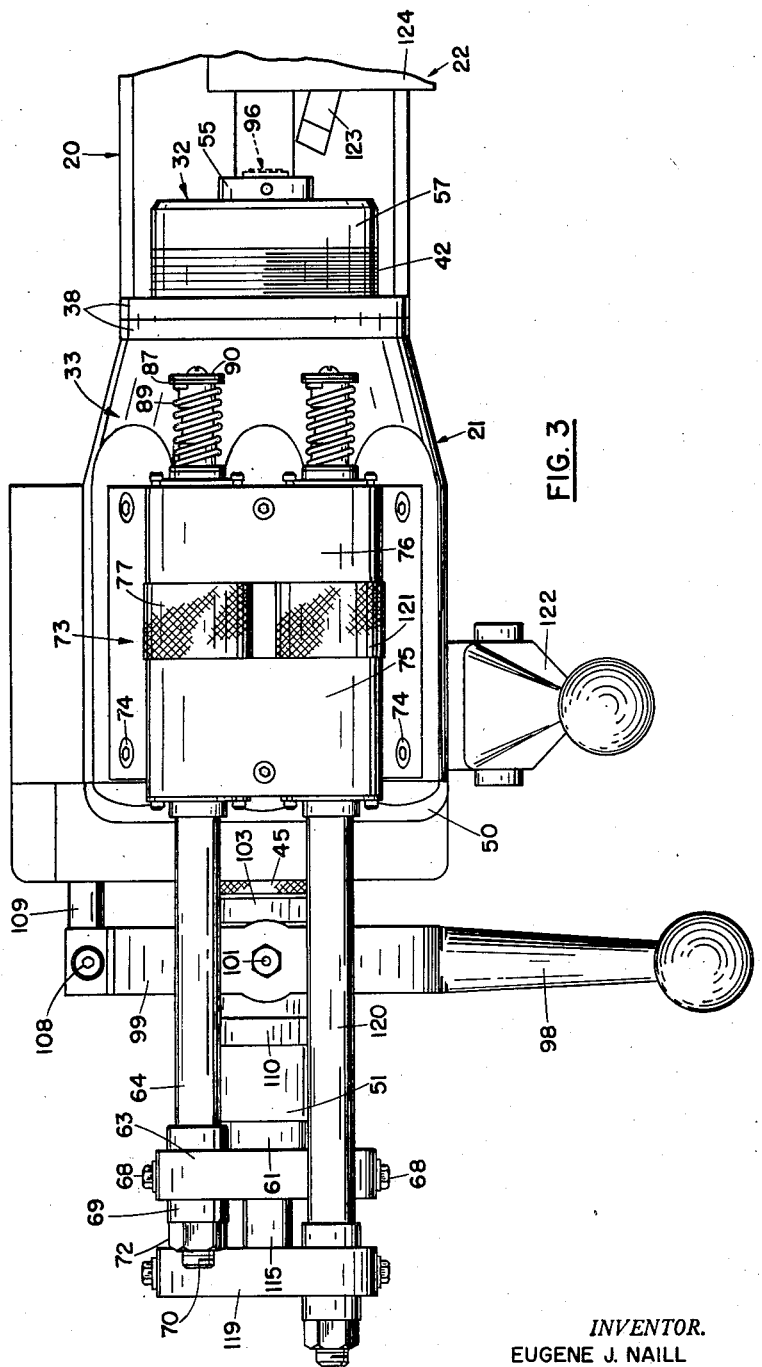
Fig. 3 is a plan view of the device shown in Fig. 2.

The hand lever 98 is first moved to the right to loosen collets 52, 55 and 92 and the cathode 96 is inserted in the ball collet 92. The hand lever 98 is moved to the left to clamp the collets together and firmly hold the cathode in place. The machine is then operated to cause rotation of the lathe spindle 32 by the motor 24. The control means for this purpose may be of any conventional type operable as by a handle 122 (Figs. 1, 2 and 3).

At this time a gauge (not shown) is moved into proximity or engagement with surface 19, depending on the type of gauge used, and the reading on the gauge indicator will inform the operator whether or not surface A is normal to the axis of the spindle 32. If adjustment is needed to position surface A normal to the axis of the spindle, this is then accomplished by manipulation of knurled nuts 77 and 121. Such adjustment will, by movement of the cam devices and angular displacement of the ball collet as described, move the cathode to a position where the indicator on the gauge will indicate that surface A is normal to the axis of the spindle which, of course, is the axis about which the cathode 96 is rotating.

After this adjustment has been made, tool 123 carried by slide 22 is moved into cutting engagement with surface B. This will cause surface B to be formed parallel with surface A. Rotation of the spindle and cathode may thereafter be discontinued and the cathode removed.

It is apparent from the foregoing description that all of the objects of this invention have been accomplished by the provision of novel means for adjusting a piece of work in a lathe as described.

While the novel features of the invention have been shown and described and are pointed out in the annexed claims, it is to be understood that various omissions, substitutions and changes in the construction and arrangement of parts shown and described may be made by those skilled in the art without departing from the spirit of the invention. Therefore, it is to be understood that all matter shown or described is to be interpreted as illustrative and not in a limiting sense.

We claim:

1. A lathe of the character described comprising a fixed support, a spindle mounted in the support for rotation about its axis, work-holding means carried by one end of the spindle for rotation therewith and angularly adjustable with respect to the axis of the spindle, control means connected with the work-holding means, and manually operable adjustment means mounted on the support and operatively connected with the control means for adjusting the work-holding means to a controlled angular relation with respect to the axis of the spindle.

2. A lathe of the character described comprising a support, a spindle mounted in the support for rotation about its axis, work-holding means carried by one end of the spindle for rotation therewith, a shaft extending from the work-holding means, the shaft and work-holding means being angularly adjustable with respect to the axis of the spindle, manually operable adjustment means mounted on the support, and cam control means connecting the adjustment means with the shaft and mounted for movement longitudinally of the spindle for adjusting the shaft and work-holding means to a controlled angular relation with respect to the axis of the spindle.

3. A lathe of the character described comprising a fixed support, a spindle mounted in the support for rotation about its axis, work-holding means carried by one end of the spindle for rotation therewith, a shaft extending from the work-holding means, the shaft and work-holding means being angularly adjustable with respect to the axis of the spindle, manually operable adjustment means mounted on the support, movable linkage extending from and operable by the adjustment means, and cam means connecting the linkage with the shaft and movable longitudinally of the spindle for angling the shaft upon movement of the linkage and cam means by the adjustment means and adjusting the work-holding means to a controlled angular relation with respect to the axis of the spindle.

4. A lathe of the character described comprising a support, a spindle mounted in the support for rotation about its axis, work-holding means carried by one end of the spindle for rotation therewith, a shaft extending from the work-holding means, the shaft and work-holding means being angularly adjustable with respect to the axis of the spindle, a cam follower on the shaft, manually operable adjustment means mounted on the support, movable linkage extending from and operable by the adjustment means, and cam means carried by the linkage and movable longitudinally of the spindle and engaging the cam follower on the shaft for angling the shaft upon movement of the linkage and cam means by the adjustment means and adjusting the work-holding means to a controlled angular relation with respect to the axis of the spindle.

5. In a lathe comprising a headstock having a tubular spindle mounted in the headstock for rotation about its axis and a work-holder at one end of the spindle and rotatable therewith, angling means extending from the work-holder into the adjacent end of the tubular spindle and with the work-holder being angularly adjustable with respect to the axis of the spindle, and adjustment means mounted on the headstock and having a portion extending into the opposite end of the spindle and operatively connected with the angling means for adjusting the angling means and work-holder to a controlled angular relation with respect to the axis of the spindle.

6. In a lathe comprising a headstock having a tubular spindle mounted in the headstock for rotation about its axis and a work-holder at one end of the spindle and rotatable therewith, angling means extending from the work-holder into the adjacent end of the tubular spindle and with the work-holder being angularly adjustable with respect to the axis of the spindle, and a manually operable adjustment device mounted on the headstock and having control means extending into the opposite end of the spindle and operatively connected with the angling means for adjusting the angling means and work-holder to a controlled angular relation with respect to the axis of the spindle.

7. In a lathe comprising a headstock having a tubular spindle mounted in the headstock for rotation about its axis and a work-holder at one end of the spindle and rotatable therewith, angling means extending from the work-holder into the adjacent end of the tubular spindle and with the work-holder being angularly adjustable with respect to the axis of the spindle, a manually operable adjustment device mounted on the headstock and having a portion extending into the opposite end of the tubular spindle, and cam control means operatively connecting the angling means and the portion of the adjustment device within the tubular spindle and movable longitudinally of the spindle for adjusting the angling means and work-holder to a controlled angular relation with respect to the axis of the spindle.

8. In a lathe comprising a headstock having a tubular spindle mounted in the headstock for rotation about its axis and a work-holder at one end of the spindle and rotatable therewith, a shaft extending from the work-holder into the adjacent end of the tubular spindle and with the work-holder being angularly adjustable with respect to the axis of the spindle, manually operable adjustment means mounted on the headstock, movable linkage extending from and operable by the adjustment means, and cam means located within the tubular spindle connecting the linkage with the shaft and movable longitudinally of the spindle for angling the shaft upon movement of the linkage and cam means by the adjustment means and adjusting the shaft and work-holder to a controlled angular relation with respect to the axis of the spindle.

9. In a lathe comprising a headstock having a tubular spindle mounted in the headstock for rotation about its axis and a work-holder at one end of the spindle and rotatable therewith, a shaft extending from the work-holder into the adjacent end of the tubular spindle and with the work-holder being angularly adjustable with respect to the axis of the spindle, a cam follower on the shaft, manually operable adjustment means mounted on the headstock, a connecting portion extending into the opposite end of the spindle operable by the adjustment means, cam means carried by the connecting portion and movable longitudinally of the spindle and engaging the cam follower on the shaft for angling the shaft upon movement of the connecting portion by the adjustment means and adjusting the work-holder to a controlled angular relation with respect to the axis of the spindle.

10. In a lathe comprising a headstock having a tubular spindle mounted in the headstock for rotation about its axis and a work-holder at one end of the spindle and rotatable therewith, angling means extending from the work-holder into the adjacent end of the spindle and carrying a cam follower thereon, manually operable adjustment means mounted on the headstock and embodying a pair of individually movable rods, connecting means extending from one of the rods into the spindle and movable upon adjustment of the rod, first cam means on the connecting means within the spindle and engaging the cam follower for moving the cam follower and shaft in a plane, second connecting means extending from the other rod into the spindle and movable upon adjustment of its respective rod, and second cam means on the second connecting means within the spindle and engaging the cam follower for moving the cam follower and shaft in a plane normal to the first-mentioned plane of movement whereby the work-holder is universally adjustable with respect to the axis of the spindle.

11. In a lathe comprising a headstock having a tubular spindle mounted in the headstock for rotation about its axis and a work-holder at one end of the spindle and rotatable therewith, angling means extending from the work-holder into the adjacent end of the spindle and carrying a cam follower thereon, manually operable adjustment means mounted on the headstock and embodying a pair of individually movable rods, connecting means extending from one of the rods into the spindle and movable longitudinally within the spindle upon adjustment of the rod, first cam means on the connecting means comprising a pair of spaced fingers having cam surfaces engaging opposite sides of the cam follower for moving the cam follower and shaft in a plane as the connecting means is moved, second connecting means extending from the other rod into the spindle and movable longitudinally of the spindle upon adjustment of its respective rod, and second cam means on the second connecting means comprising a pair of spaced fingers located at 90° with respect to the fingers on the first connecting means and having cam surfaces engaging the cam follower for moving the cam follower and shaft in a plane normal to the first-mentioned plane of movement whereby the work-holder is universally adjustable with respect to the axis of the spindle.

12. In a lathe comprising a headstock having a tubular spindle mounted in the headstock for rotation about its axis and a work-holder at one end of the spindle and rotatable therewith, angling means extending from the work-holder into the adjacent end of the spindle and carrying a cam follower thereon, manually operable adjustment means mounted on the headstock and embodying a pair of individually movable rods, connecting means extending from each of the rods and terminating adjacent the end of the spindle opposite the work-holder, a tubular member extending from one of the connecting means into the spindle and movable longitudinally of the spindle upon adjustment of the rod and consequent movement of the connecting means, first cam means on the tubular member comprising a pair of spaced fingers having cam surfaces engaging opposite sides of the cam follower for moving the cam follower and shaft in a plane as the tubular member is moved, a shaft extending from the second connecting means within the tubular member and movable longitudinally of the spindle upon adjustment of its respective rod, and second cam means on the shaft comprising a pair of spaced fingers located at 90° with respect to the fingers on the tubular member and having cam surfaces engaging the cam follower for moving the cam follower and shaft in a plane normal to the first-mentioned plane of movement whereby the work-holder is universally adjustable with respect to the axis of the spindle.

References Cited in the file of this patent

UNITED STATES PATENTS

| 2,044,042 | Adams | June 16, 1936 |
| 2,378,912 | Collins | June 26, 1945 |

FOREIGN PATENTS

| 85,452 | Germany | Feb. 13, 1896 |